United States Patent
Mao et al.

(10) Patent No.: US 10,552,851 B2
(45) Date of Patent: Feb. 4, 2020

(54) OPPORTUNITY LIST ENGINE

(75) Inventors: Weining Mao, Phoenix, AZ (US); Ozlem Kinav, Scottsdale, AZ (US)

(73) Assignee: AMERIPRISE FINANCIAL, INC., Minneapolis, MN (US)

( * ) Notice: Subject to any disclaimer, the term of this patent is extended or adjusted under 35 U.S.C. 154(b) by 425 days.

(21) Appl. No.: 13/400,429

(22) Filed: Feb. 20, 2012

(65) Prior Publication Data
US 2013/0218805 A1    Aug. 22, 2013

(51) Int. Cl.
*G06Q 30/02*    (2012.01)
*G06Q 30/06*    (2012.01)

(52) U.S. Cl.
CPC ..... *G06Q 30/0201* (2013.01); *G06Q 30/0633* (2013.01)

(58) Field of Classification Search
CPC ......... G06F 17/30867; G06F 17/30705; G06F 17/307; G06F 17/00; G06F 17/60; G06Q 10/067; G06Q 30/02; G06Q 30/0201; G06Q 30/0269; G06Q 30/0204; G06Q 30/0251; G06Q 30/307; G06Q 30/0202; G06Q 30/0224; G06Q 30/60; G06Q 30/0631
See application file for complete search history.

(56) References Cited

U.S. PATENT DOCUMENTS

| 5,987,434 | A | 11/1999 | Libman |
| 6,029,153 | A | 2/2000 | Bauchner et al. |
| 6,078,892 | A * | 6/2000 | Anderson ............... G06Q 30/02 705/14.64 |
| 6,754,874 | B1 * | 6/2004 | Richman ................ G06Q 10/10 715/205 |
| 6,999,938 | B1 | 2/2006 | Libman |
| 7,526,439 | B2 | 4/2009 | Freishtat et al. |
| 7,546,248 | B2 | 6/2009 | Ellison et al. |
| 7,890,366 | B2 | 2/2011 | Libman |
| 8,645,223 | B2 * | 2/2014 | Ouimet .............. G06Q 30/0633 705/26.1 |
| 2001/0014868 | A1 * | 8/2001 | Herz et al. ...................... 705/14 |
| 2002/0120435 | A1 * | 8/2002 | Frazier ................... G06N 3/105 704/1 |
| 2002/0123923 | A1 * | 9/2002 | Manganaris ........... G06Q 30/02 705/7.33 |
| 2002/0127529 | A1 * | 9/2002 | Cassuto ................... G09B 5/02 434/335 |
| 2002/0194050 | A1 * | 12/2002 | Nabe ..................... G06Q 10/06 705/7.31 |
| 2004/0034570 | A1 * | 2/2004 | Davis ................. G06Q 30/0254 705/7.31 |
| 2004/0133497 | A1 * | 7/2004 | Spear .................... G06Q 40/00 705/36 R |

(Continued)

FOREIGN PATENT DOCUMENTS

WO    WO0106405    * 1/2001    ............. G06F 17/00

*Primary Examiner* — William J Jacob
(74) *Attorney, Agent, or Firm* — McDonnell Boehnen Hulbert & Berghoff LLP

(57) ABSTRACT

A method includes receiving a selection of a particular client (or advisor) and determining likelihoods of the selected client (or clients associated with the selected advisor) purchasing products based on the one or more factors correlating previous purchasers of the products. The method includes generating a prioritized list of sales opportunities associated with the selected client (or selected advisor) based on the likelihoods.

12 Claims, 8 Drawing Sheets

(56) References Cited

U.S. PATENT DOCUMENTS

| | | | |
|---|---|---|---|
| 2005/0010472 A1* | 1/2005 | Quatse | G06Q 30/02 |
| | | | 705/14.13 |
| 2006/0281065 A1* | 12/2006 | Margiotta | G09B 19/00 |
| | | | 434/365 |
| 2007/0100684 A1 | 5/2007 | Gartner | |
| 2008/0195633 A1* | 8/2008 | Rose et al. | 707/100 |
| 2008/0281678 A1 | 11/2008 | Keuls et al. | |
| 2009/0254423 A1* | 10/2009 | Ellison | G06Q 10/00 |
| | | | 705/7.42 |
| 2010/0049538 A1* | 2/2010 | Frazer | G06Q 30/02 |
| | | | 705/14.4 |
| 2010/0114992 A1* | 5/2010 | Casas | G06Q 10/067 |
| | | | 707/809 |
| 2011/0246255 A1 | 10/2011 | Gilbert et al. | |
| 2011/0246260 A1 | 10/2011 | Gilbert et al. | |
| 2012/0078813 A1* | 3/2012 | Rose | G06Q 40/06 |
| | | | 705/36 R |
| 2012/0278091 A1* | 11/2012 | Yaseen | G06Q 30/02 |
| | | | 705/1.1 |

* cited by examiner

Opportunities by Client

View Opportunities for: *Any Advisor*

My Clients | Jump To: *Enter name*

| Bush, Mary | 12345678 |
| Doe, John | 23456789 |
| Doe, Sue | 34567890 |
| Smith, John | 56789012 |
| Smith, Annie | 67890123 |

Cross Cornerstones

| Title | Rank |
|---|---|
| Financial Planning | 100 |
| Match Details | |

Cornerstone: Cash and Liabilities

| Title | Rank |
|---|---|
| Home Equity Line of Credit | 95 |
| Match Details | |
| Credit Card | 93 |
| Match Details | |

Cornerstone: Protection

| Title | Rank |
|---|---|
| Universal Life Insurance | 90 |
| Match Details | |
| Long-term Care Protection | 50 |
| Match Details | |

Cornerstone: Investments

| Title | Rank |
|---|---|
| REIT  Match Details | 95 |
| Variable Annuities | 98 |
| Match Details — 201 | |
| Mutual Fund | 88 |
| Match Details | |
| Managed Account | 90 |
| Match Details | |

Cornerstone: Taxes

| Title | Rank |
|---|---|
| IRA Contribution | 41 |
| Match Details | |

*FIG. 2*

Client Matching Details

| Client Name | Client Age | Household Total Asset under Management | Household with Financial Plan | Household with Variable Annuity |
|---|---|---|---|---|
| Doe, John | 63 | $274,457 | Yes | No |

Client Age
  Variable annuities are most often purchased by clients between the ages of 40-70.

Household Total Assets under Management
  Households with more total assets under management are more likely to buy a variable annuity product.

Household with Financial Plan
  Households with a financial plan are more likely to buy variable annuity than those without one.

Household with Variable Annuity
  With this information, an advisor can identify the opportunity to leverage variable annuity meet a client's need.

*FIG. 3*

ОPPORTUNITY LIST ENGINE

BACKGROUND

To achieve financial goals, individuals often create relationships with financial advisors. For example, each financial advisor employed or contracted by a financial advising enterprise may have relationships with clients through financial planning. Each financial advisor may regularly consult with his or her financial planning clients to help the clients achieve their stated financial goals. Financial advisors may use computer systems to assist in the financial planning process.

During consultations between a financial advisor and a client, the financial advisor may attempt to sell certain financial planning products to the financial planning client. However, because the various product groups of the financial advising enterprise may be disjointed, there may not be a way to examine sales opportunities for the client in a holistic manner or to compare sales opportunities for products in different product groups. Moreover, because each product group may evaluate opportunities independently, financial advisors may receive confusing or conflicting instructions regarding sales opportunities. As the enterprise grows and expands, more products and services may be developed and new business units may be created to manage the new products and services, resulting in a further "siloing" of information and less effective evaluation of sales opportunities.

SUMMARY

Systems and methods of evaluating a client's purchase potential in a holistic manner are disclosed. For example, an opportunity list engine (OLE) may integrate data from multiple product groups with predictive analysis and modeling to identify and rank product and service opportunities for clients and advisors from amongst all products and services provided by an enterprise. Thus, opportunities regarding product offerings from different core groups (e.g., "cornerstones") such as cash and liabilities, investments, protection, and taxes may be compared. To illustrate, the OLE may produce a prioritized list of sales opportunities for a particular client (e.g., what products the particular client is most likely to purchase) and a prioritized list of sales opportunities for a particular advisor with respect to various products (e.g., which of the particular advisor's clients are most likely to buy particular products, such as mutual funds, annuities, stocks, etc.).

The OLE may also provide field leaders (supervisors) and product wholesalers with insight into strengths and weaknesses of individual advisors. For example, if a particular advisor has low historical annuity sales but high annuity sales opportunity, the OLE engine may identify this gap and may enable field leaders and product wholesalers to provide communication and training to the advisor in an effort to address the gap.

BRIEF DESCRIPTION OF THE DRAWINGS

FIG. 2 is a diagram to illustrate a particular embodiment of an interface that includes a prioritized list of sales opportunities for a particular client;

FIG. 3 is a diagram to illustrate a particular embodiment of client match details accessible via the interface of FIG. 2;

DETAILED DESCRIPTION

Figure 1:
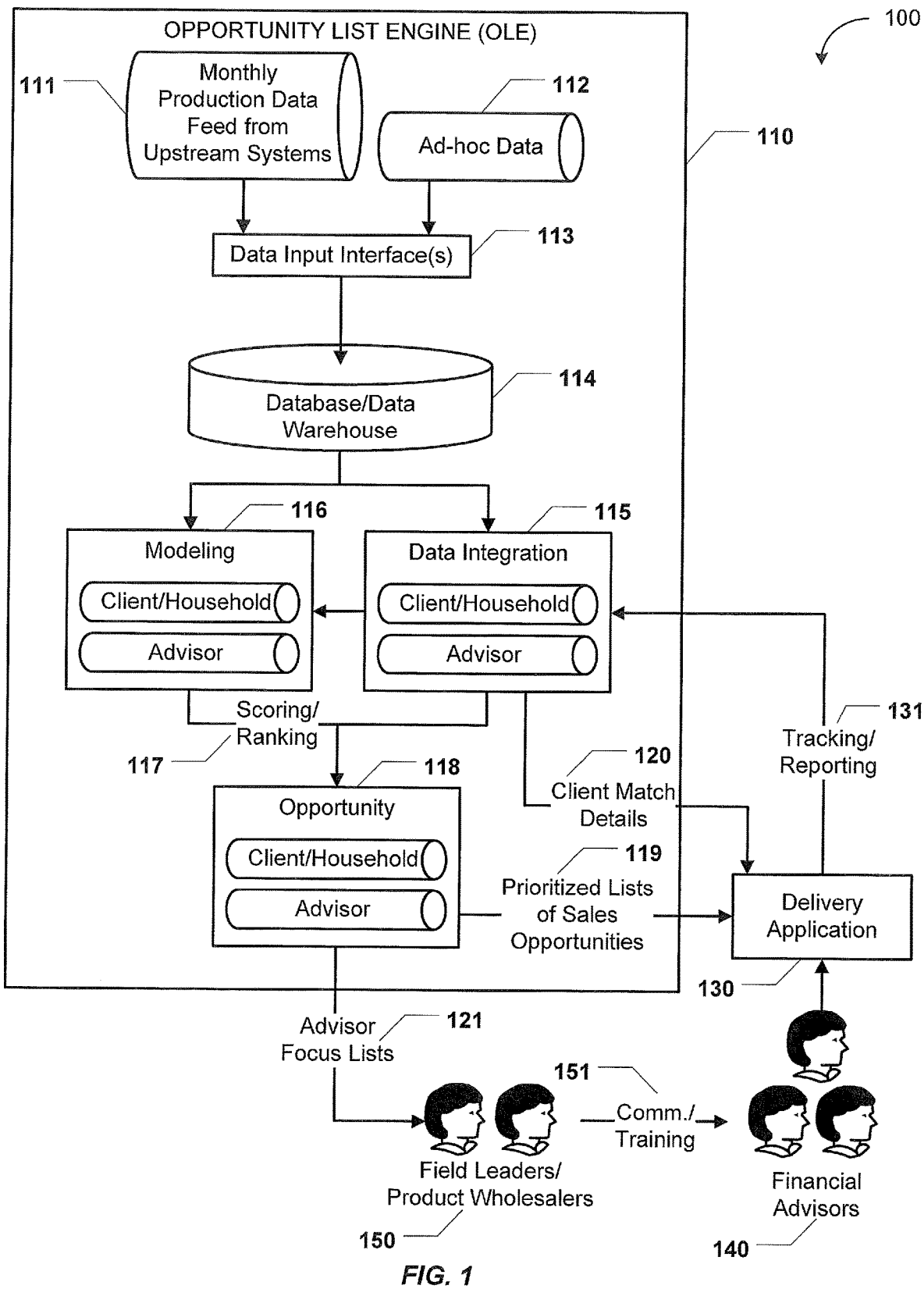
FIG. 1 is a diagram to illustrate a particular embodiment of a system that includes an opportunity list engine (OLE) that is operable to generate prioritized lists of sales opportunities.

FIG. 1 illustrates a particular embodiment of a system 100 that includes an opportunity list engine (OLE) 110 that is operable to generate prioritized lists of sales opportunities. It should be noted that although the OLE 110 is described herein in the context of a financial advising enterprise, this context is for example only. Prioritized lists of sales opportunities may be generated as described herein for various types of products, clients, and advisors/salespersons.

In a particular embodiment, the OLE 110 may be a server-side data processing and analysis application that provides data to or is accessed by one or more client-side applications. For example, a delivery application 130 may operate as a client-side front-end for business intelligence provided by the OLE 110. The delivery application 130 may be available to financial advisors 140, field leaders/product wholesalers 150, and other members of a financial advising enterprise as a software program executing on client workstations, as an Internet-accessible web application, or via some other deployment method.

The OLE 110 may include at least one data input interface 113. The data input interface 113 may include a software interface, such as a database application programming interface (API) and/or a hardware interface such as a network interface (e.g., wired or wireless network interface). The data input interface 113 may receive historical sales data associated with past sales of various products to various clients. For example, historical sales data may include production data 111 (e.g., a monthly production data feed from upstream systems such as one or more sales trackers at the enterprise) and/or ad-hoc data 112 (e.g., sales data that is manually provided on a periodic or intermittent basis). The historical sales data may be stored in a database/data warehouse 114. For example, the database/data warehouse 114 may store or have access to database tables representing product details (e.g., product type, product value, etc.), purchase details (e.g., time of purchase, quantity/value of purchase, etc.), and client details (e.g., client account and profile information). In an alternate embodiment, database/data warehouse 114 may be external to the OLE 110.

The OLE 110 may also include a data integration module 115, a modeling module 116, and an opportunity module 118. In a particular embodiment, each of the modules 115, 116, and 118 is implemented via processor-executable instructions stored in a memory or other tangible processor-readable medium. The data integration module 115 may aggregate the historical sales data stored in the database/data warehouse 114 (e.g., "raw data") on a client level, a household level, and an advisor level. The modeling module 116 may segment the aggregated data by one or more variables, such as age and income bracket. The modeling module 116 may also generate purchase likelihood models based on the historical sales data.

In a particular embodiment, the modeling module 116 may generate the purchase likelihood models via regression analysis performed by one or more modelers. To illustrate, the historical data in the database/data warehouse 114 or integrated data from the data integration module 115 may include data related to past sales of a term life insurance product, such as the age and demographic information associated with clients that have recently purchased the term life insurance product. By incorporating the results of a regression analysis that compares clients who have previously purchased the term life insurance product with those clients who haven't purchased the product, the modeling module 116 may identify one or more predictive factors that most correlate client product purchase behavior, such as client age or whether the client has any children. The modeling module 116 may also generate an estimated coefficient for each of the predictive factors that determine a client's purchase likelihood for the term life insurance product. Generally, the purchase likelihood model may be a mathematical expression that, when applied to a client that has not yet purchased the term life insurance product, can predict, with reasonable accuracy, the likelihood of the client purchasing the term life insurance product when offered. Factors included in a purchase likelihood model may include age, geographic location, net worth, income, debt level, family status, any other factor tracked by the enterprise, or any combination thereof.

To maintain a high level of predictive accuracy, purchase likelihood models produced by the modeling module 116 may be validated and refreshed. One method of validation may involve using historical sales data. To illustrate, the purchase likelihood model for the term life insurance product may be generated based on some, but not all, of the term life insurance purchasers from the database/data warehouse 114. For example, the previous purchasers of the term life insurance product may be divided into two mutually exclusive sets: Set A and Set B. After the purchase likelihood model is created based on Set A, the purchase likelihood model may be validated by applying the model to Set B. The degree to which the model accurately predicts that the clients in Set B have purchased the term life insurance product provides insight into the accuracy of the model. The clients in Set A and Set B may be from the same time period or from different time periods. In a particular embodiment, purchase likelihood models may be validated periodically. Purchase likelihood models may also be refreshed periodically (e.g., monthly when new production data 111 is input into the database/data warehouse 114 or the data integration module 115).

It should be noted that although described above with respect to term life insurance, the modeling module 116 may create purchase likelihood models for various kinds of financial products, including investment products, cash products, liabilities products, insurance products, tax products, and/or retirement products.

The opportunity module 118 may utilize the various purchase likelihood models and scoring/ranking information 117 produced by the modeling module 116 to generate prioritized lists 119 of sales opportunities on a per-client, per-household, and per-advisor basis. In a particular embodiment, scoring a purchase likelihood model may include the application of the purchase likelihood model to the most recent sales/OLE data. For example, a prioritized list of sales opportunities for a selected client (or selected household) may rank financial products that the selected client (or selected household) is most likely to purchase if offered (e.g., "What products is client X most likely to buy?"). An illustrative example of an interface that includes sales opportunities for a selected client is further described with reference to FIG. 2. Conversely, a prioritized list of sales opportunities for a selected advisor may rank clients of the selected advisor that are most likely to purchase various products (e.g., "Which of advisor Y's clients are most likely to buy mutual funds? Stocks? Bonds? Annuities?"). An illustrative example of an interface that includes sales opportunities for a selected advisor is further described with reference to FIG. 4.

The opportunity module 118 may further generate advisor focus lists 121. For example, when a particular advisor has low historical annuity sales production but highly ranked annuity sales opportunities, the opportunity module 118 may identify this gap and may add the particular advisor to the advisor focus lists 121. Based on the advisor's inclusion in the advisor focus lists 121, the field leaders/product wholesalers 150 may provide communication and training 151 to the advisor, so that the advisor is better prepared to sell annuities, or other identified products, to the highly ranked clients. Alternately, or in addition, communication and training 151 may be automatically initiated by the OLE 110 and/or the delivery application 130. For example, the OLE 110 of FIG. 1 may generate a schedule of upcoming annuities seminars that is displayed via the delivery application 130 of FIG. 1. In a particular embodiment, training and communication materials are stored at and/or accessible to the OLE 110, the delivery application 130, or any combination thereof.

The delivery application 130 may display the prioritized lists 119 of sales opportunities to the financial advisors 140. The delivery application 130 may also collect tracking/reporting information 131. For example, the tracking/reporting information 131 may indicate successful sales and earned commissions from opportunities in the lists 119, so that the enterprise may measure the adoption rate and impact of the opportunity lists 119 and actions taken by the financial advisors 140. In a particular embodiment, the delivery application 130 may provide client match details 120 along with the prioritized lists 119 of sales opportunities, so that the financial advisors 140 can see what factors/data in a client's account or profile contributed to the rankings. An example of an interface including client match details is further described with reference to FIG. 3.

In a particular embodiment, the opportunity module 118 may suppress certain identified opportunities. For example, due to factors such as high income and high net worth, the OLE 110 may identify a twenty-five year-old client as a prospective annuity buyer. However, because annuities may traditionally be considered retirement products and may penalize withdrawals before age 56, such a recommendation may be surprising to a financial advisor and may cause the financial advisor to question the integrity of the opportunity lists 119. To mitigate such confusion, the financial advisor or the enterprise may provide opportunity suppression criteria to the OLE 110 (e.g., "Do not recommend annuities for clients less than thirty years old."). The opportunity module 118 may remove the annuity recommendation for the twenty-five year-old client from the lists 119 based on a match with the opportunity suppression criteria. Generally, opportunity suppression criteria may be input in response to various factors. For example, another reason the financial advisor may wish to suppress the annuity recommendation for the twenty-five year-old client may be that the advisor knows the client has already purchased annuities from another company.

It should be noted that a prioritized list of sales opportunities for a particular client or advisor may include a single opportunity or multiple opportunities. Thus, the prioritized list (e.g., ranked from highest to lowest) may be based on a likelihood of a client purchasing a single product or on likelihoods of the client purchasing multiple products. In a particular embodiment, the list may also be subject to user-provided constraints (e.g., "do not show sales opportunities rated less than 70 out of 100"). Thus, the prioritized list may be based at least in part on a likelihood of a client purchasing a particular product.

It will be appreciated that the system 100 of FIG. 1 may thus provide benefits to various parties associated with the financial advising process. For example, a financial advising company may benefit from comprehensive assessment and prioritization of opportunities for the company as a whole, rather than each product group focusing on its own opportunities and strengths. This may enable creation of improved cross-sell, up-sell, and retention strategies. Identifying and remedying gaps in advisor capability may also strengthen the company as a whole. In addition, a more holistic understanding of opportunities may lead to improved product recommendations, thereby enhancing client satisfaction. Individual advisor practices may also benefit from improved sales, increased client retention, and focused training materials. Advisors and clients may also benefit from the time saved and improved efficiency enabled by the system 100 of FIG. 1 in helping advisors better serve their clients and sell products. The business intelligence provided by the system 100 of FIG. 1 may also enable product manufacturers (including the company) to shorten product development/launch cycles and develop products with a greater likelihood of success. Further, the predictive models and underlying data used may be refreshed and validated periodically (e.g., monthly) to maintain a high level of accuracy. The system 100 of FIG. 1 may thus provide a "one-stop" end-to-end tool to prepare advisors for client conversations via detailed product information, sales literature, and training.

FIG. 2 illustrates a particular embodiment of an interface 200 that includes a prioritized list of sales opportunities for a particular client. In an illustrative embodiment, the interface 200 may be generated based on output from the OLE 110 of FIG. 1 and may be displayed via the delivery application 130 of FIG. 1.

The interface 200 may list sales opportunities for a selected client John Doe, indicating how likely the client John Doe is to purchase various financial planning products. In the example depicted in FIG. 2, the interface uses "out of 100" numeral rankings, and classifies products under a "Cash and Liabilities" cornerstone, an "Investments" cornerstone, a "Protection" cornerstone, a "Taxes" cornerstone, or a "Cross Cornerstones" group. To illustrate, the client John Doe is rated 95 for home equity line of credit (HELOC), 93 for credit card, 95 for REIT, 88 for mutual funds, 98 for variable annuities, 90 for managed account, 100 for financial planning, 90 for universal life insurance, 50 for long-term care protection, and 41 for individual retirement account (IRA) contribution. In a particular embodiment, the interface 200 may also provide access to client match details (e.g., the client match details 120 of FIG. 1) for each recommended product. For example, clicking on a "Match Details" link 201 may enable a financial advisor to view an interface that explains why the client John Doe was rated 98 out of 100 for variable annuities, as further illustrated in FIG. 3.

It should be noted that the particulars of the interface 200 of FIG. 2 are for example only. In some embodiments, a client view interface may include more, less, and/or different information than depicted in FIG. 2. For example, a client view interface may also include a snapshot of a particular client, including demographic characteristics, recently purchased financial planning products, asset allocation information, and account information for the selected client. It should also be noted that the use of "out of 100" numeral rankings in FIG. 2 is for example only. Sales opportunities may alternately be ranked and displayed using other methods and visual metaphors. In a particular embodiment, the interface 200 of FIG. 2 may highlight "new" opportunities (e.g., opportunities discovered since the last time the financial advisor used the opportunity list engine 110 of FIG. 1 and/or the delivery application 130 of FIG. 1) via an icon, color change, font change, or some other visual aid.

The interface 200 of FIG. 2 may thus provide a holistic comparison of purchase likelihoods of a client with respect to products from multiple product groups and cornerstones of a financial advising enterprise.

FIG. 3 illustrates a particular embodiment of an interface 300 that is accessible via the link 201 of FIG. 2. The interface 300 includes client match details explaining why the client John Doe is rated 98 out of 100 for variable annuities.

The interface 300 may include profile information 301 for a selected client. For example, as illustrated in FIG. 3, the selected client John Doe is 63 years old, has $274,457 worth of assets under management (AUM) with the financial advising company, has an implemented financial plan, but does not own any variable annuity product.

The interface 300 may also include explanations 302 regarding how different attributes of the client John Doe's profile information 301 may affect the client John Doe's likelihood of purchasing a variable annuity product. It will thus be appreciated that the information included in the interface 300 of FIG. 3 may not only explain scoring/ranking of clients, which may increase an advisor's trust in the OLE system, but may also provide a starting point for the advisor to begin discussing product sales with the selected client. For example, based on the explanations 302, the financial advisor may begin trying to sell a variable annuity product to the selected client John Doe by explaining to the client that he is likely to benefit from such a product because he is between the ages of 40-70 and has almost $275,000 of assets under management.

Figure 4:
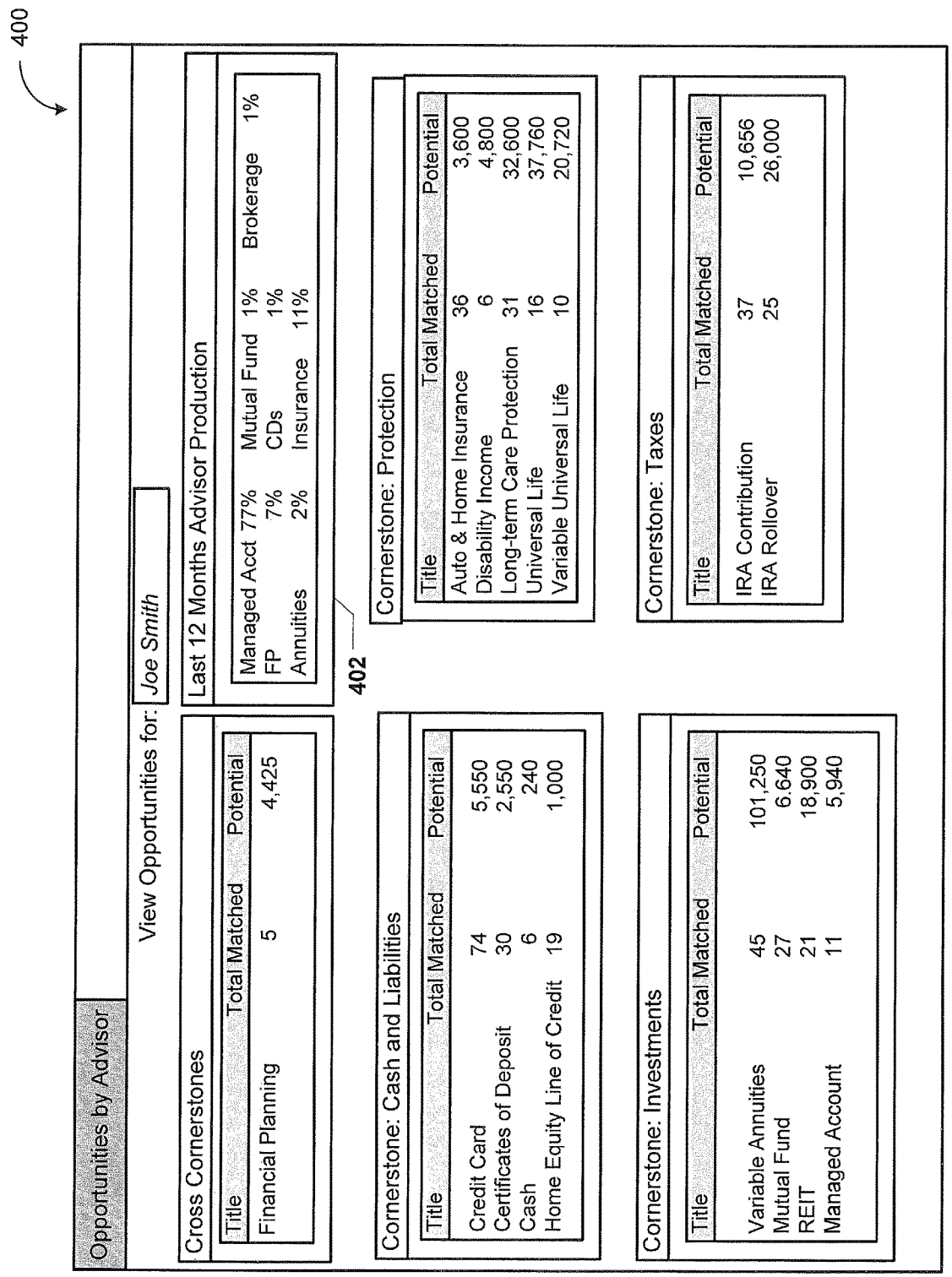
FIG. 4 is a diagram to illustrate a particular embodiment of an interface that includes prioritized lists of sales opportunities for a particular advisor.

FIG. 4 illustrates a particular embodiment of an interface 400 that includes prioritized lists of sales opportunities for a particular advisor. In an illustrative embodiment, the interface 400 may be generated based on output from the OLE 110 of FIG. 1 and may be displayed via the delivery application 130 of FIG. 1.

The interface 400 may include a sales opportunity summary indicating how many clients of a selected advisor (e.g., an advisor Joe Smith) match particular sales opportunities. In the particular example of FIG. 4, the sales opportunities are classified under a "Cash and Liabilities" cornerstone, an "Investments" cornerstone, a "Protection" cornerstone, a "Taxes" cornerstone, or a "Cross Cornerstones" group. To illustrate, the advisor Joe Smith has 74 matches for credit card and 37 matches for IRA contributions. In a particular embodiment, when a particular financial product is selected via the interface 400, a corresponding list of matching clients is displayed. For example, in response to a selection of the credit card product, the interface 400 may display a list of the corresponding 74 matching clients sorted by score/ranking in descending order.

As described with reference to FIG. 1, an OLE system may also identify "gaps" in an advisor's practice. In a particular embodiment, a gap for a particular product (or product group) may be identified based on a combination of low historical production by an advisor and high available opportunities for the advisor. For example, as illustrated in an advisor production summary 402 of FIG. 4, annuities represented only 2% of the advisor Joe Smith's production for the previous 12 months. However, 45 clients representing a large potential revenue (and therefore commission) match the variable annuity product. Thus, the advisor Joe Smith may be identified as having a production gap with respect to annuities. In some implementations, training materials and/or links to training materials may be displayed or may otherwise be made accessible to financial advisors via an interface. Training materials may include, but are not limited to, a schedule of upcoming seminars (e.g., annuities sales seminars), product brochures and information, etc.

It should be noted that the particulars of the interface 400 of FIG. 4 are for example only. In some embodiments, an advisor view interface may include more, less, and/or different information. For example, the interface 400 may also include or provide access to a snapshot of the practice of a particular advisor, including information regarding current clients of accounts opened by, accounts closed by, accounts retained by, and products sold by the selected advisor.

The interface 400 of FIG. 4 may thus provide a financial advisor with lists of clients and products to focus on, as well as the opportunity for the training that may improve the advisor's sales production.

Figure 5:
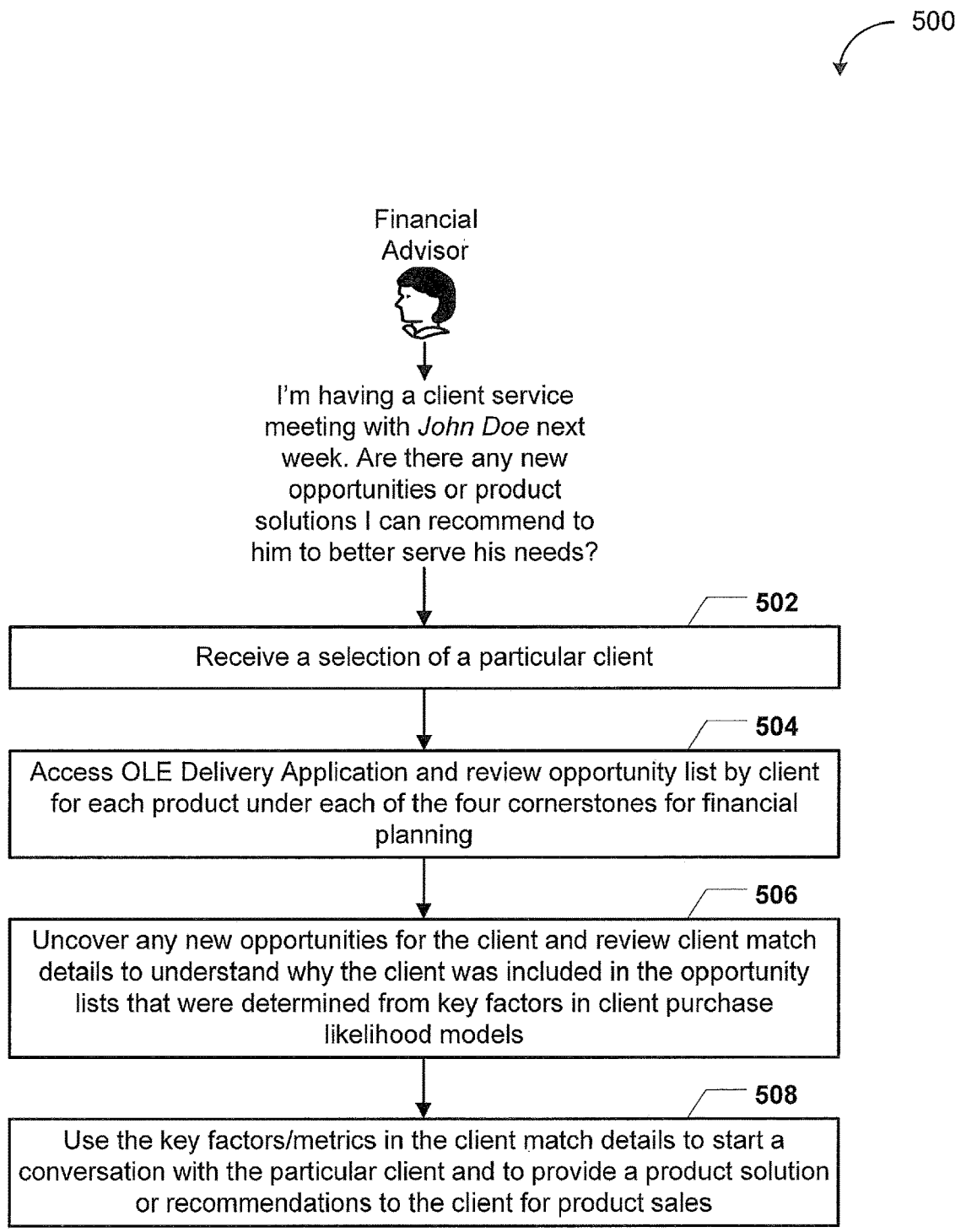
FIG. 5 is a flowchart to illustrate a particular embodiment of a process flow associated with use of a prioritized list of sales opportunities for a particular client.

FIG. 5 illustrates a particular embodiment of a method 500 associated with use of a prioritized list of sales opportunities for a particular client. In an illustrative embodiment, the method 500 may be performed at the system 100 of FIG. 1 and may be illustrated with reference to the interfaces 200, 300, and 400 of FIGS. 2-4. The method 500 may generally represent a process flow utilized by a financial advisor in preparation for and during a meeting with a particular client. For example, as illustrated in FIG. 5, a financial advisor may realize that he or she has an upcoming client service meeting with the client John Doe and may wonder if there are any new opportunities or product solutions that may better serve the client's needs.

The method 500 may include receiving a selection of a particular client, at 502. For example, using the delivery application 130 of FIG. 1, the financial advisor may select the client John Doe (e.g., as illustrated with reference to FIG. 2). The method 500 may also include accessing an OLE delivery application and reviewing an opportunity list by client, at 504. The opportunity list may include products under each of a plurality of product groups. For example, the advisor may review the opportunities for the client John Doe illustrated by the "Opportunities by Client" tab of the client view interface 200 of FIG. 2.

The method 500 may include uncovering any new opportunities for the client and reviewing client match details to understand why the client was included in the opportunity lists, at 506. The opportunity lists may be determined from key factors in client purchase likelihood models. For example, in addition to reviewing the opportunities illustrated by the client view interface 200 of FIG. 2, the advisor may also view corresponding client match details via the client match details interface 300 of FIG. 3.

The method 500 may further include using the key factors/metrics in the client match details to start a conversation with the particular client and to provide a product solution or recommendations to the client for product sales, at 508. For example, the advisor may start a conversation with the client John Doe regarding a potential purchase a variable annuities product, mentioning that such a purchase is recommended due to the client's age and assets under management, as described with reference to FIG. 3.

The method 500 of FIG. 5 may thus enable a financial advisor to view ranked sales opportunities for a particular client based on key factors of purchase likelihood models. Moreover, opportunities regarding products from different product groups may be evaluated and presented. An advisor may use the ranked sales opportunities to make more focused and informed sales presentations or client meetings, which may increase client satisfaction, advisor commissions, and enterprise revenue.

Figure 6:
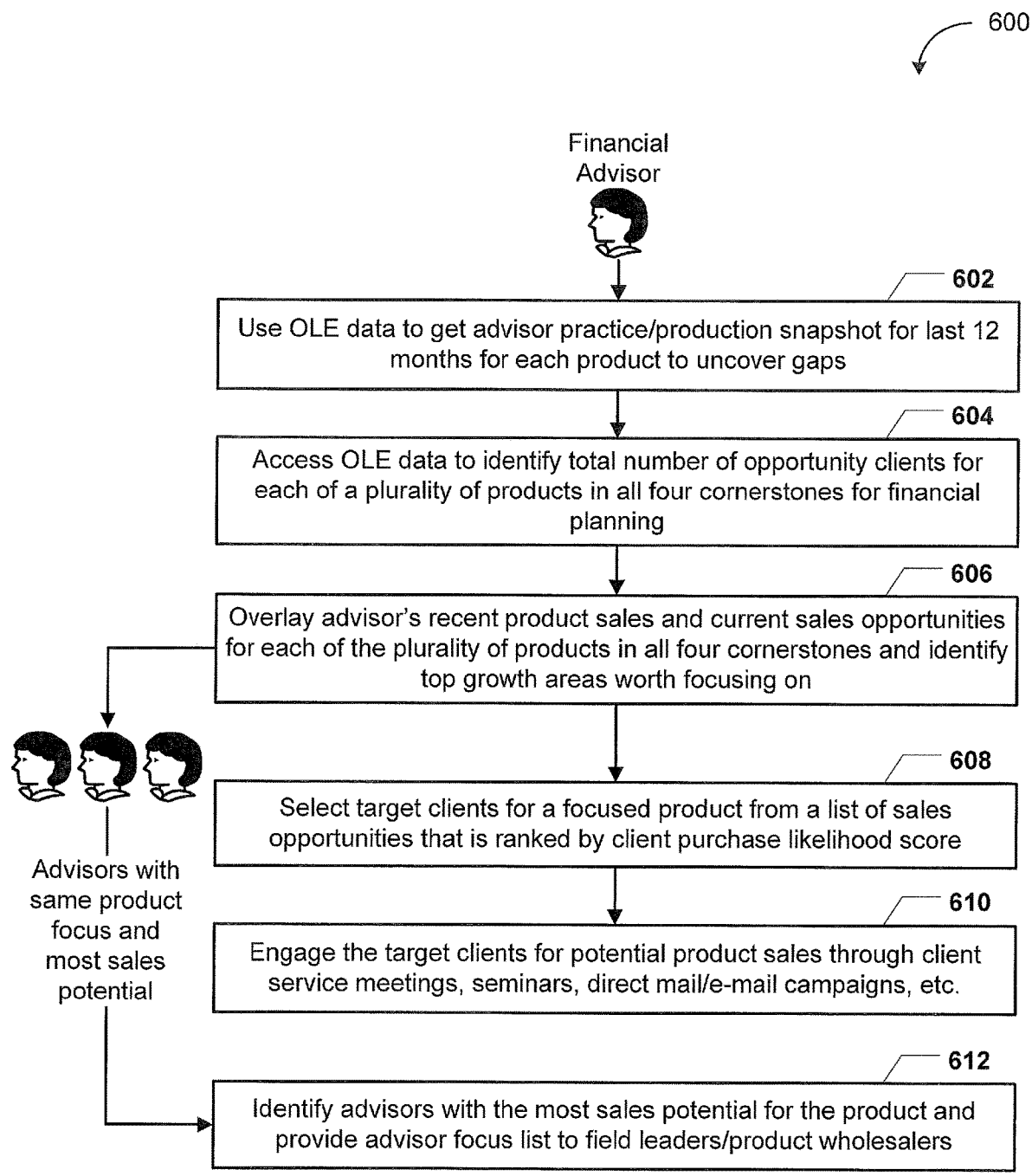
FIG. 6 is a flowchart to illustrate a particular embodiment of a process flow associated with use of a prioritized list of sales opportunities for a particular advisor and with identifying advisors for inclusion in an advisor focus list.

FIG. 6 illustrates a particular embodiment of a method 600 associated with use of a prioritized list of sales opportunities for a particular advisor. In an illustrative embodiment, the method 600 may be performed at the system 100 of FIG. 1 and may be illustrated with reference to the interfaces 200, 300, and 400 of FIGS. 2-4.

The method 600 may include using OLE data to get advisor practice/production snapshots for the last 12 months for each product to uncover product gaps, at 602. The method 600 may also include accessing OLE data to identify a total number of opportunity clients for each of a plurality of products, at 604. For example, an advisor production snapshot and numbers of matching clients or products in each of the four product cornerstones for the advisor Joe Smith may be provided as described with reference to the advisor view interface 400 of FIG. 4.

The method 600 may further include overlaying the advisor's recent product sales and current sales opportunities for each of the plurality of products and identifying top growth areas worth focusing on, at 606. For example, as described with reference to the advisor view interface 400 of FIG. 4, the product area of annuities may be identified as a growth area for the advisor Joe Smith.

The method 600 may include selecting target clients for a focused product from a list of sales opportunities that is ranked by client purchase likelihood score, at 608. The method 600 may also include engaging the target clients for potential product sales, at 610. In a particular embodiment, clients may be engaged via client service meetings, seminars, direct mail or e-mail campaigns, etc. For example, the advisor Joe Smith may engage one or more of the 45 matched clients for the variable annuities product identified in the advisor view interface 400 of FIG. 4.

As the method 600 of FIG. 6 is performed by multiple advisors at a financial advising enterprise, advisors with the same product focus and most sales potential (e.g., advisors that have similar practice "gaps") may be identified, at 612. The identified advisors may be included in an advisor focus list that is provided to field leaders and product wholesalers. For example, referring to FIG. 1, the OLE system 100 may include the identified advisors in the advisor focus lists 121 to the field leaders/product wholesalers 150.

The method 600 of FIG. 6 may provide an advisor with ranked sales opportunities with respect to a selected product. An advisor may use the ranked sales opportunities to make more focused and informed sales presentations. The method 600 of FIG. 6 may also enable an enterprise to identify gaps between advisor production and opportunity and initiate actions to remedy the gaps, which may increase client satisfaction, advisor commissions, and enterprise revenue.

Figure 7:
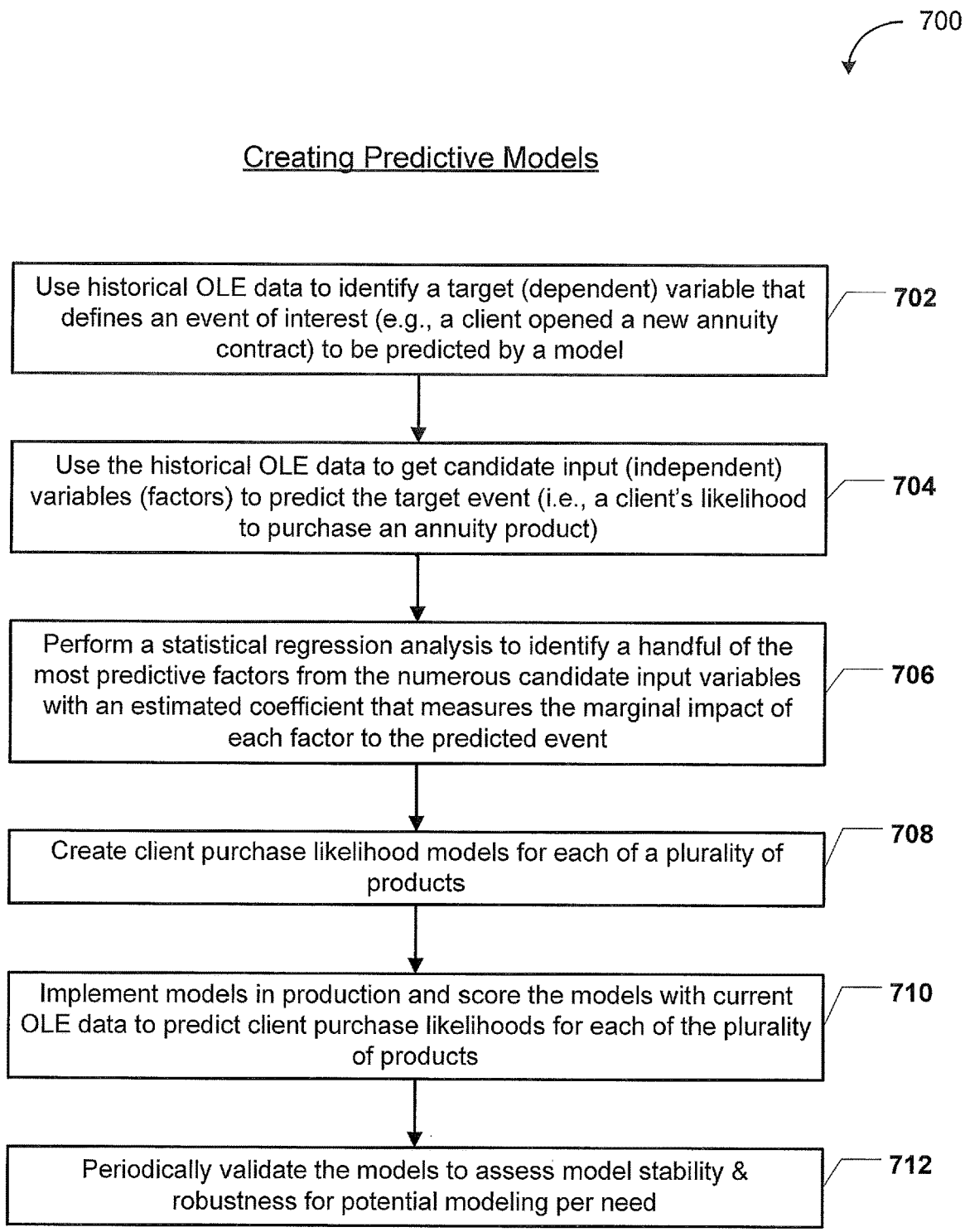
FIG. 7 is a flowchart to illustrate a particular method of generating and validating models of the likelihood to purchase in conjunction with the described embodiments.

FIG. 7 illustrates a particular embodiment of a method 700 of client purchase likelihood model creation and validation. In an illustrative embodiment, the method may be performed by the system 100 of FIG. 1. For example, purchase likelihood models generated and validated by the method 700 of FIG. 7 may provide underlying purchase likelihood data for the interfaces 200, 300, and 400 of FIGS. 2-4 and the methods 500 and 600 of FIGS. 5-6.

The method 700 may include accessing historical OLE data representative of a plurality of clients and a plurality of products. The historical OLE data may be used to identify a target (dependent) variable that defines an event of interest, at 702, and get candidate input (independent) variables (factors) to predict the target event, at 704. To illustrate, the event of interest may be a client opening a new annuity contract and the target event may include predicting a client's likelihood of purchasing an annuity product. For example, in FIG. 1, the data warehouse 114 and data integration module 115 in the OLE 110 may have all the historical data for modelers to develop the client purchase likelihood models. The method 700 may also include performing a statistical regression analysis with the historical OLE data on the data to identify a handful of the most predictive factors with their estimated slope coefficients that measure the marginal impacts of each of the factors to the predicted event, at 706. For example, in FIG. 1, the modeling module 116 may incorporate a regression analysis in order to identify that a significant percentage of previous term life insurance purchasers were in a younger age bracket and married with children, and that a significant percentage of previous annuity purchasers were in a particular income bracket and in a particular net worth bracket.

The method 700 may further include creating purchase likelihood models for each of the plurality of products, at 708. For example, in FIG. 1, the modeling module 116 may create purchase likelihood models for various products sold by the enterprise, including term life insurance and annuities. After all models are developed, the method 700 may implement models in production and score them with the most current OLE data to get client purchase likelihoods for each of the plurality of products, at 710. The method 700 may include periodically or occasionally validating the purchase likelihood models to assess the model stability and robustness over time, at 712. For example, in FIG. 1, the modeling module 116 may validate the purchase likelihood models via application of the models to other clients or to data from a different time period. It should be noted that model validation may also be performed upon user command.

Figure 8:
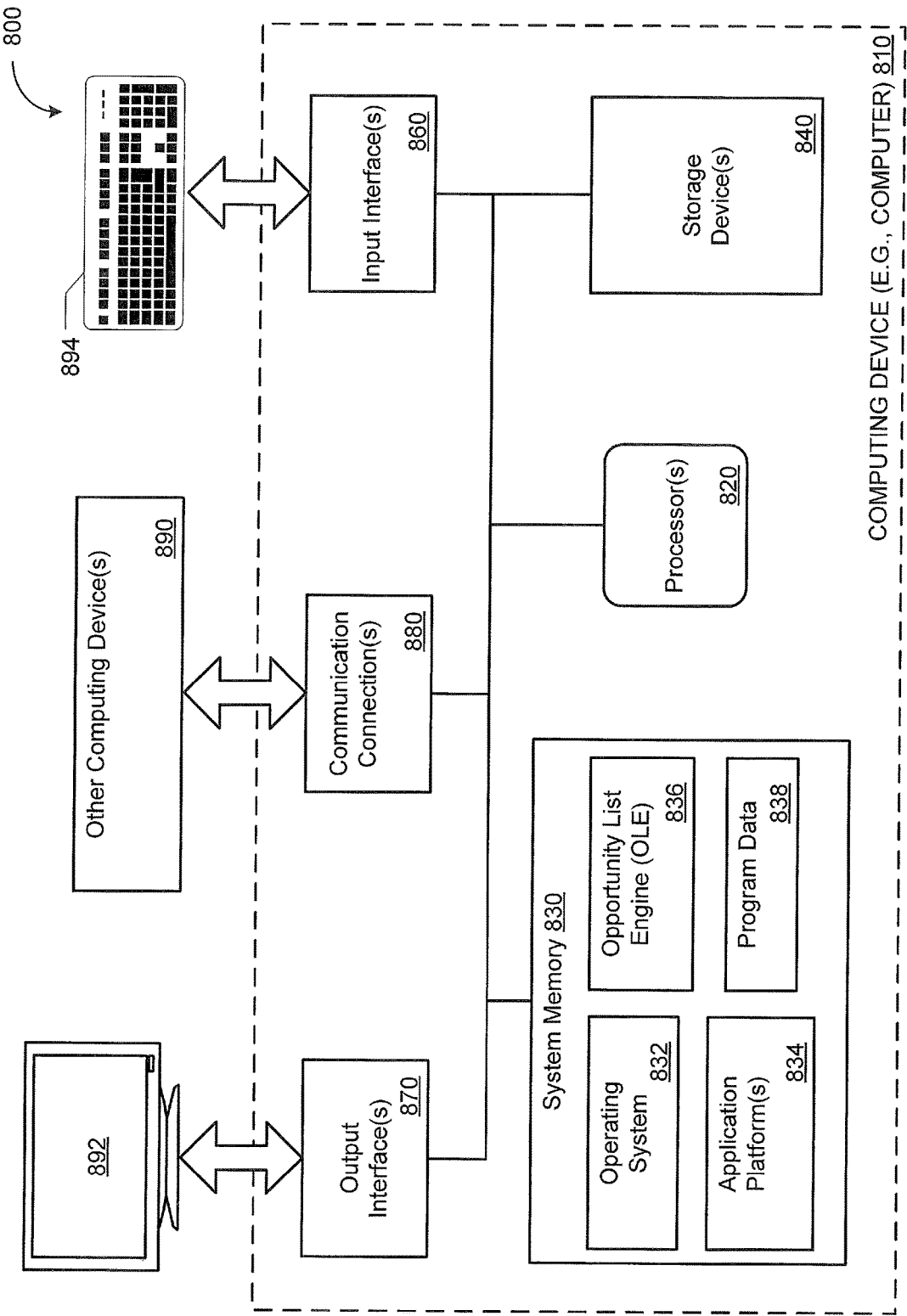
FIG. 8 is a diagram to illustrate a particular embodiment of a computing environment including a computing device that may be used to implement the methods, systems, and/or computer program products described with reference to FIGS. 1-7.

FIG. 8 is a block diagram of a computing environment 800 including a computing device 810 that is operable to support embodiments of computer-implemented methods, computer program products, and system components according to the present disclosure.

The computing device 810 includes at least one processor 820 and a system memory 830. For example, the computing device 810 may be a desktop computer, a laptop computer, a tablet computer, a mobile phone, a server, or any other fixed or mobile computing device. Depending on the configuration and type of computing device, the system memory 830 may be volatile (such as random access memory or "RAM"), non-volatile (such as read-only memory or "ROM," flash memory, and similar memory devices that maintain stored data even when power is not provided), some combination thereof, or some other memory. The system memory 830 may include an operating system 832, one or more application platforms 834, one or more applications, and program data 838. In the embodiment illustrated, the system memory 830 includes an opportunity list engine (OLE) 836 or executable instructions corresponding thereto. For example, the OLE 836 may be the OLE 110 of FIG. 1 and may be executable to perform all or a portion of the methods described with reference to FIGS. 5-7. The OLE 836 may also generate the interfaces, or provide data in support of generating the interfaces, described with reference to FIGS. 2-4.

The computing device 810 may also have additional features or functionality. For example, the computing device 810 may also include removable and/or non-removable additional data storage devices, such as magnetic disks, optical disks, tape, and memory cards. Such additional storage is illustrated in FIG. 8 by storage device(s) 840. For example, the storage device(s) 840 may implement the database/data warehouse 114 of FIG. 1 and store product data, purchase data, and client data. Computer-readable or processor-readable storage media may include volatile and/or non-volatile storage and removable and/or non-removable media implemented in any technology for storage of information such as computer-readable instructions, data structures, program components or other data. The system memory 830 and the storage device(s) 840 are examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, and other non-transitory media that can be used to store information and that can be accessed by the computing device 810. Any such computer storage media may be part of the computing device 810.

The computing device 810 may also have one or more input devices, such as an illustrative keyboard 894, a mouse, a pen, a voice input device, a touch input device, etc. connected via one or more input interfaces 860. One or more output devices, such as an illustrative display device 892, speakers, a printer, etc. may also be included and connected via one or more output interfaces 870. The input interfaces 860 and the output interfaces 870 may each include one or more wired or wireless interfaces, such as a universal serial bus (USB) interface, a video graphics array (VGA) interface, a serial interface, a digital visual interface (DVI), a high-definition multimedia interface (HDMI), or some other interface. In an illustrative embodiment, the one or more output interfaces 870 are operable to transmit the interfaces described with reference to FIGS. 2-4 to the display device 892.

The computing device 810 has one or more communication connections 880 that enable the computing device 810 to communicate with other computing devices 890 over a wired or a wireless network.

Particular embodiments of disclosed techniques may be implemented in conjunction with a client-server architecture. To illustrate, the computing device 810 may be an application server or other server that hosts the OLE 836. A user (e.g., one of the financial advisors 140 of FIG. 1) may operate a client computing device that executes or accesses the delivery application 130 of FIG. 1, where the delivery application 130 of FIG. 1 communicates with the OLE 836 application server via the one or more communication connections 880. Alternately, the computing device 810 may represent a client computing device, such as a financial advisor's workstation.

It will be appreciated that not all of the components or devices illustrated in FIG. 8 or otherwise described in the previous paragraphs are necessary to support embodiments as herein described. It will also be appreciated that the computing device 810 may have additional or different components or devices than illustrated in FIG. 8 or otherwise described in the previous paragraphs.

Although the exemplary embodiments described herein are intended to enable a person skilled in the art to practice such embodiments, it should be understood that other embodiments may be realized and that logical and physical changes may be made without departing from the scope of the present disclosure. Thus, the detailed description herein is presented for purposes of illustration only and not for limitation.

For the sake of brevity, conventional data networking, application development and other functional aspects of the systems (and components of the individual operating components of the systems) may not be described in detail herein. Furthermore, the connecting lines shown in the various figures are intended to represent exemplary functional relationships and/or physical couplings between the various elements. It should be noted that many alternative or additional functional relationships or physical connections may be present in a system.

In one embodiment, portions of the present disclosure may be implemented using a system that includes a software module, logic engines, computer hardware, databases, and/or computer networks. Moreover, while the description may make reference to specific technologies, system architectures, and data management techniques, it will be appreciated that other devices and/or methods that use different technologies, architectures, or techniques may be implemented without departing from the scope of the disclosure. Similarly, while the description may make reference to web clients, personal computers, and servers, it will be appreciated that other embodiments may include implementations using point of service (POS) devices, kiosks, handheld devices such as personal digital assistants cellular telephones, smartphones, or other devices. This disclosure is intended to cover any and all subsequent adaptations or variations of various embodiments.

The Abstract is not intended to be used in interpreting or limiting the scope or meaning of the claims. In addition, the disclosure is not to be interpreted as indicating that the claimed embodiments require more features than are expressly recited in each claim. Thus, the present disclosure is not intended to be limited to the embodiments shown herein but is to be accorded the widest scope possible consistent with the principles and novel features as defined by the following claims.

What is claimed is:

1. A system for automatically identifying training opportunities for a plurality of advisors from a plurality of data sources across an enterprise, the system comprising:
   one or more network interfaces configured to communicate with at least a first computing device and a database via a network, wherein the first computing device comprises an advisor computer associated with a particular advisor and wherein the database comprises a plurality of data records associated with historical sales data of a plurality of products;
   a memory device;
   a processor configured to:
   identify, by a regression analysis, predictive factors based on the historical sales data of each of the plurality of products, the historical sales data received at the one or more network interfaces from the database;
   generate a plurality of purchase likelihood models based on the predictive factors, each of the plurality of purchase likelihood models corresponding to one of the plurality of products;
   determine, based on the plurality of purchase likelihood models, likelihoods of each of a plurality of clients purchasing each of the plurality of products;
   generate a plurality of prioritized lists based on the likelihoods, wherein the prioritized lists include sales opportunities lists;
   generate an output interface to be transmitted to the first computing device, wherein the output interface indicates one or more of the plurality of prioritized lists;
   automatically determine, based on a portion of the historical sales data of the plurality of products associated with the particular advisor, a deficiency in training for the particular advisor for each one of the plurality of products;
   generate scheduling data based on a gap between: a sales production indicated by the portion of the historical sales data associated with the particular advisor and a sales opportunity indicated by at least one of the likelihoods that is associated with a particular product; and
   initiate transmission of the output interface and the scheduling data to the first computing device from the one or more network interfaces to cause display of a schedule of training opportunities associated with the particular product at the first computing device.

2. The system of claim 1, wherein the processor is further configured to validate and refresh the plurality of purchase likelihood models to maintain predictive accuracy.

3. The system of claim 1, wherein at least one of the plurality of purchase likelihood models corresponds to an investment product, a cash product, a liabilities product, an insurance product, or a retirement product.

4. The system of claim 1, wherein the processor is configured to remove a product from at least one of the plurality of prioritized lists based on suppression criteria.

5. The system of claim 1, wherein the historical sales data is associated with an individual or a household.

6. The system of claim 1, wherein the processor is further configured to segment the historical sales data based on age or income bracket.

7. The system of claim 1, wherein the predictive factors include a net worth, a debt level, a family status, or a combination thereof.

8. An apparatus for automatically identifying training opportunities for a plurality of advisers from a plurality of data sources across an enterprise, the apparatus comprising:
   means for communicating with at least a first device via a network, wherein the first device comprises an advisor computer associated with a particular advisor;
   means for storing a plurality of data records associated with historical sales data of a plurality of products;
   means for generating a plurality of purchase likelihood models based on predictive factors, each of the plurality of purchase likelihood models corresponding to one of a plurality of products, the predictive factors identified based on the historical sales data of each of the plurality of products, the historical sales data received at the means for communicating;

means for automatically determining, based on a portion of the historical sales data of the plurality of products associated with a particular advisor, a deficiency in training for the particular advisor for each one of the plurality of products; and means for generating an output interface that indicates one or more of a plurality of prioritized lists and for generating scheduling data, wherein the plurality of prioritized lists is generated based on likelihoods of each of a plurality of clients purchasing each of the plurality of products, wherein the likelihoods are based on the plurality of purchase likelihood models, wherein the output interface indicates the likelihoods of a particular client purchasing each of the plurality of products, and wherein a portion of the scheduling data is generated based on a gap between: a sales production indicated by the portion of the historical sales data associated with the particular advisor and a sales opportunity indicated by at least one of the likelihoods that is associated with a particular product, wherein the means for communicating is further configured to transmit the output interface and the scheduling data to the first device to cause display of a schedule of training opportunities associated with the particular product at the first device.

9. A method for automatically identifying training opportunities for a plurality of advisors from a plurality of data sources across an enterprise, the method comprising:

receiving historical sales data of a plurality of products via a network interface of a server;

identifying, by a regression analysis at the server, predictive factors based on the historical sales data of each of the plurality of products;

generating, by the server, a plurality of purchase likelihood models based on the predictive factors, each of the plurality of purchase likelihood models corresponding to one of the plurality of products;

determining, at the server and based on the plurality of purchase likelihood models, likelihoods of each of a plurality of clients purchasing each of the plurality of products;

generating, at the server, a plurality of prioritized lists based on the likelihoods, wherein the prioritized lists include sales opportunities lists;

generating, at the server, an output interface to be transmitted to a first computing device, wherein the output interface is based on the plurality of prioritized lists, and wherein the first computing device comprises an advisor computer associated with a particular advisor;

automatically determining, based on a portion of the historical sales data of the plurality of products associated with the particular advisor, a deficiency in training for the particular advisor for each one of the plurality of products;

generating, at the server, scheduling data based on a gap between: a sales production indicated by the portion of the historical sales data associated with the particular advisor and a sales opportunity indicated by at least one of the likelihoods that is associated with a particular product; and transmitting the output interface and the scheduling data from the server to the first computing device via the network interface to cause display of a schedule of training opportunities associated with the particular product at the first computing device.

10. The method of claim 9, further comprising:

generating, at the server, product data based on the portion of the historical sales data associated with the particular advisor and the portion of the likelihoods associated with the particular product, wherein the product data indicates product brochures for the particular product; and transmitting the product data from the server to the first computing device via the network interface to cause display of the product brochures at the first computing device.

11. The method of claim 9, further comprising associating the particular advisor with an advisor focus list in response to identifying the deficiency in training for the particular advisor, wherein the server automatically initiates generation and transmission of the scheduling data.

12. The method of claim 9, wherein the scheduling data is based on a particular gap identified between a relatively low historical sales production associated with the particular advisor and a relatively highly ranked sales opportunity for the particular product associated with the particular advisor.

* * * * *